(12) United States Patent
Nakayama et al.

(10) Patent No.: US 9,067,502 B2
(45) Date of Patent: Jun. 30, 2015

(54) VEHICLE

(75) Inventors: Takurou Nakayama, Okazaki (JP);
Akihiro Sato, Nagoya (JP); Tsuyoshi Hayashi, Miyoshi (JP); Hirotaka Watanabe, Toyota (JP); Kenji Kimura, Miyoshi (JP); Nobuyoshi Fujiwara, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/241,013

(22) PCT Filed: Aug. 30, 2011

(86) PCT No.: PCT/JP2011/004834
§ 371 (c)(1),
(2), (4) Date: Feb. 25, 2014

(87) PCT Pub. No.: WO2013/030882
PCT Pub. Date: Mar. 7, 2013

(65) Prior Publication Data
US 2014/0210209 A1    Jul. 31, 2014

(51) Int. Cl.
*H01M 10/625* (2014.01)
*B60L 11/18* (2006.01)
*H01M 2/10* (2006.01)
*H01M 10/663* (2014.01)

(52) U.S. Cl.
CPC ............ *B60L 11/18* (2013.01); *H01M 2/1083* (2013.01); *H01M 10/5016* (2013.01); *H01M 10/5095* (2013.01); *H01M 2220/20* (2013.01); *Y10S 903/951* (2013.01)

(58) Field of Classification Search
CPC . B60L 11/18; H01M 2/1083; H01M 10/5016; H01M 10/5095; H01M 2220/20; Y10S 903/951

USPC .......................... 180/65.1, 65.22, 65.29, 68.5
See application file for complete search history.

(56) References Cited

U.S. PATENT DOCUMENTS 7,839,116 B2 * 11/2010 Esaka et al. ................... 320/103
7,924,562 B2 * 4/2011 Soma et al. ................... 361/694

(Continued)

FOREIGN PATENT DOCUMENTS

| JP | 2007-8443 | 1/2007 |
| JP | 2007-311290 | 11/2007 |
| JP | 2011-113702 | 6/2011 |

*Primary Examiner* — John Walters
*Assistant Examiner* — Brian Swenson
(74) *Attorney, Agent, or Firm* — Finnegan, Henderson, Farabow, Garrett & Dunner, LLP

(57) ABSTRACT

A vehicle has a motor serving as a driving source for running the vehicle, a high-power assembled battery and a high-capacity assembled battery each capable of supplying an electric power to the motor, and a temperature adjusting mechanism adjusting the temperature of each of the high-power assembled battery and the high-capacity assembled battery. The temperature adjusting mechanism supplies a heat exchange medium for use in the temperature adjustment of the high-power assembled battery and the high-capacity assembled battery to each of the assembled batteries. The high-power assembled battery is capable of charge and discharge with a current relatively larger than that in the high-capacity assembled battery. The high-capacity assembled battery has an energy capacity relatively larger than that of the high-power assembled battery, has a higher dependence of battery characteristic on temperature than that of the high-power assembled battery, and is placed on a flow path of the heat exchange medium upstream of the high-power assembled battery.

9 Claims, 8 Drawing Sheets

(56) References Cited

U.S. PATENT DOCUMENTS

| | | | |
|---|---|---|---|
| 8,047,316 B2 * | 11/2011 | Takami et al. | 180/65.29 |
| 8,283,878 B2 * | 10/2012 | Suyama | 318/139 |
| 8,463,475 B2 * | 6/2013 | Seta et al. | 701/22 |
| 2008/0196957 A1 | 8/2008 | Koike et al. | |
| 2009/0141447 A1 | 6/2009 | Soma et al. | |
| 2013/0049676 A1 * | 2/2013 | Ishikawa et al. | 320/103 |

* cited by examiner

VEHICLE

CROSS-REFERENCE TO RELATED APPLICATIONS

This application is a national phase application of International Application No. PCT/JP2011/004834, filed Aug. 30, 2011, the content of which is incorporated herein by reference.

TECHNICAL FIELD

The present invention relates to a vehicle including a plurality of assembled batteries having different characteristics.

BACKGROUND ART

A battery system described in Patent Document 1 includes a high-capacity battery and a high-power battery which are connected in parallel to a load. The high-capacity battery has an energy capacity larger than that of the high-power battery. The high-power battery allows charge and discharge with a current larger than that in the high-capacity battery.

PRIOR ART DOCUMENT

Patent Document

[Patent Document 1] Japanese Patent Laid-Open No. 2006-079987

DISCLOSURE OF THE INVENTION

Problems to be Solved by the Invention

Patent Document 1 has disclosed a vehicle including the high-capacity battery and the high-power battery but has not made any disclosure of an arrangement of the high-capacity battery and the high-power battery. The high-capacity battery and the high-power battery may have different characteristics or may be used in different manners. The salability of the vehicle may be reduced unless the high-capacity battery and the high-power battery are mounted on the vehicle in view of the characteristics and the like of the high-capacity battery and the high-power battery.

Means for Solving the Problems

A vehicle according to the present invention has a motor serving as a driving source for running the vehicle, a high-power assembled battery and a high-capacity assembled battery each capable of supplying an electric power to the motor, which are constituted by secondary batteries, respectively, and a temperature adjusting mechanism configured to adjust the temperature of each of the high-power assembled battery and the high-capacity assembled battery. The temperature adjusting mechanism supplies a heat exchange medium for use in temperature adjustment of the high-power assembled battery and the high-capacity assembled battery to each of the assembled batteries. The temperature adjusting mechanism can be provided by using a duct supplying the heat exchange medium to the high-power assembled battery and the high-capacity assembled battery and a blower configured to flow the heat exchange medium.

The high-power assembled battery is capable of charge and discharge with a current relatively larger than that in the high-capacity assembled battery. The high-capacity assembled battery has an energy capacity relatively larger than that of the high-power assembled battery and has a higher dependence of battery characteristic on temperature than that of the high-power assembled battery. The high-capacity assembled battery is placed on a flow path of the heat exchange medium upstream of the high-power assembled battery. Examples of the battery characteristic include the capacity of the battery and the input/output power of the battery.

Since the high-capacity assembled battery has the higher dependence on temperature than that of the high-power assembled battery, the temperature adjustment of the high-capacity assembled battery can be performed with a higher priority than the temperature adjustment of the high-power assembled battery by placing the high-capacity assembled battery upstream of the high-power assembled battery. This can efficiently perform the temperature adjustment of the high-capacity assembled battery to ensure the battery characteristics of the high-capacity assembled battery.

In running of the vehicle including an engine serving as a driving source for running the vehicle by using an output from the motor with the engine stopped, the high-capacity assembled battery can supply a more electric power to the motor than that from the high-power assembled battery. The preferential use of the high-capacity assembled battery can extend the running distance of the vehicle with the motor to improve the fuel economy.

In the running of the vehicle using the output from the motor with the engine stopped, the frequency of use of the high-capacity assembled battery can be higher than the frequency of use of the high-power assembled battery. In running of the vehicle using the output from the motor with the engine stopped, the proportion of the electric power supplied from the high-capacity assembled battery to the motor in the electric power supplied to the motor can be higher than the proportion of the electric power supplied from the high-power assembled battery to the motor.

The high-capacity assembled battery can be charged by using an external power source. The external power source is a power source placed outside the vehicle and formed as a unit separate from the vehicle. When the external power source is used to charge only the high-capacity assembled battery, out of the high-power assembled battery and the high-capacity assembled battery, then the high-capacity assembled battery generates more heat than the high-power assembled battery. Since the high-capacity assembled battery has the energy capacity relatively larger than that of the high-power assembled battery and can store the relatively higher electric energy, the high-capacity assembled battery generates more heat than the high-power assembled battery due to charge with the external power source. Since the temperature adjustment of the high-capacity assembled battery is performed with the higher priority than the temperature adjustment of the high-power assembled battery, a rise in temperature of the high-capacity assembled battery can be suppressed during the charge.

The high-power assembled battery and the high-capacity assembled battery can be placed in a luggage space. The use of the luggage space can easily ensure the space for placing the high-power assembled battery and the high-capacity assembled battery.

The high-power assembled battery can have a plurality of cells connected in series. The high-capacity assembled battery can have a plurality of cells connected in parallel. A square-type cell can be used as the cell of the high-power assembled battery, and a cylinder-type cell can be used as the cell of the high-capacity assembled battery.

The cell of the high-capacity assembled battery can have a size smaller than that of the cell of the high-power assembled battery. The size of the cell of the high-capacity assembled battery smaller than the size of the cell of the high-power assembled battery allows the amount of heat exchanged between the high-capacity assembled battery and the heat exchange medium to be smaller than the amount of heat exchanged between the high-power assembled battery and the heat exchange medium. Thus, the heat exchange medium after the temperature adjustment of the high-capacity assembled battery can be used to perform the temperature adjustment of the high-power assembled battery. In other words, the heat exchange medium after the temperature adjustment of the high-capacity assembled battery can still have the ability to adjust the temperature of the high-power assembled battery.

The high-power assembled battery can have a plurality of square-type cells placed side by side in a predetermined direction. The heat exchange medium used in the temperature adjustment of the high-power assembled battery can enter into space formed between two of the cells adjacent in the predetermined direction to exchange heat with the high-power assembled battery. The high-capacity assembled battery can have a plurality of cylinder-type cells extending in a direction orthogonal to a predetermined plane and placed in order within the predetermined plane. The heat exchange medium used in the temperature adjustment of the high-capacity assembled battery can move along the predetermined plane to exchange heat with the high-capacity assembled battery.

Such a flow path for the heat exchange medium in the high-power assembled battery has a pressure loss which tends to be higher than that in the high-capacity assembled battery. As the pressure loss is increased, noise is produced more easily. Since the high-capacity assembled battery is placed upstream of the high-power assembled battery, the high-capacity assembled battery can block the noise produced in the high-power assembled battery. This can prevent the noise produced in the high-power assembled battery from being directed toward the outside (especially, the space where passengers ride).

MODE FOR CARRYING OUT THE INVENTION

An embodiment of the present invention will hereinafter be described.

Embodiment 1

Figure 1:
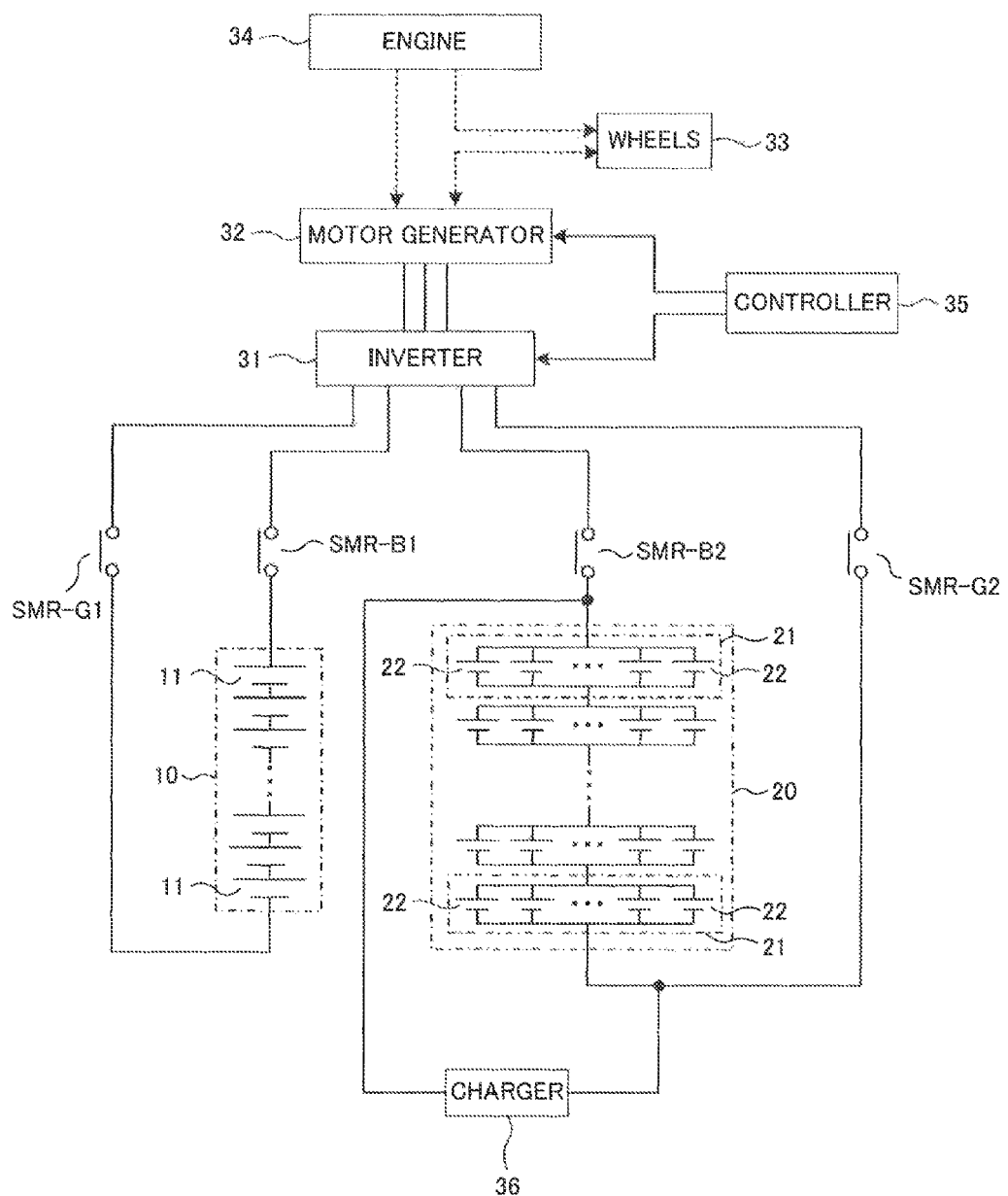
FIG. 1 is a diagram showing the configuration of a battery system.

A battery system according to the present embodiment is described with reference to FIG. 1. FIG. 1 is a schematic diagram showing the configuration of the battery system. The battery system according to the present embodiment is mounted on a vehicle. In FIG. 1, connections indicated by solid lines represent electrical connections, and connections indicated by dotted lines represent mechanical connections.

The battery system has a high-power assembled battery 10 and a high-capacity assembled battery 20 which are connected in parallel to each other. The high-power assembled battery 10 is connected to an inverter 31 through system main relays SMR-B1 and SMR-G1. The high-capacity assembled battery 20 is connected to the inverter 31 through system main relays SMR-B2 and SMR-G2. The inverter 31 converts a DC power supplied from each of the assembled batteries 10 and 20 into an AC power.

A motor generator 32 (AC motor) is connected to the inverter 31 and receives the AC power supplied from the inverter 31 to generate a kinetic energy for running the vehicle. The motor generator 32 is connected to wheels 33. An engine 34 is connected to the wheels 33, and a kinetic energy generated by the engine 34 is transferred to the wheels 33.

For decelerating or stopping the vehicle, the motor generator 32 converts a kinetic energy produced in braking the vehicle into an electric energy (AC power). The inverter 31 converts the AC power generated by the motor generator 32 into a DC power and supplies the DC power to the assembled batteries 10 and 20. This allows the assembled batteries 10 and 20 to store the regenerative power.

A controller 35 outputs a control signal to each of the inverter 31 and the motor generator 32 to control the driving thereof. The controller 35 also outputs a control signal to each of the system main relays SMR-B1 and B2, and SMR-G1 and G2 to make switching thereof between ON and OFF.

When the system main relays SMR-B1 and SMR-G1 are ON, charge and discharge of the high-power assembled battery 10 are allowed. When the system main relays SMR-B1 and SMR-G1 are OFF, the charge and discharge of the high-power assembled battery 10 are inhibited. When the system main relays SMR-B2 and SMR-G2 are ON, charge and discharge of the high-capacity assembled battery 20 are allowed. When the system main relays SMR-B2 and SMR-G2 are OFF, the charge and discharge of the high-capacity assembled battery 20 are inhibited.

While the assembled batteries 10 and 20 are connected to the inverter 31 in the present embodiment, the present invention is not limited thereto. Specifically, a step-up circuit may be placed on the current path between the assembled batteries 10 and 20 and the inverter 31. This arrangement enables the step-up circuit to increase the voltage output from each of the assembled batteries 10 and 20.

The vehicle according to the present embodiment includes not only the assembled batteries 10 and 20 but also the engine 34 as the power source for running the vehicle. The engine 34 includes one which employs gasoline, a diesel fuel, or a biofuel.

A charger 36 is connected to a positive electrode terminal and a negative electrode terminal of the high-capacity assembled battery 20 and supplies electric power from an external power source to the high-capacity assembled battery 20. A commercial power source can be used as the external power source, for example. When the commercial power source is used, the charger 36 converts an AC power into a DC power. A method of supplying the electric power from the external power source to the vehicle (high-capacity assembled battery 20) may be a power transmission method of contact type or non-contact type.

In the power transmission method of the contact type, a charge connector connected to the external power source through a cable can be connected to a charge inlet provided for the vehicle 100 to supply the electric power from the external power source to the vehicle (high-capacity assembled battery 20), for example. In the power transmission method of the non-contact type, the electric power can be transmitted from a power-transmitting section connected to the external power source to a power-receiving section mounted on the vehicle by using electromagnetic induction or resonance. By way of example, the power-transmitting section can be placed on the ground.

While the high-capacity assembled battery 20 is charged with the charger 36 in the present embodiment, the high-power assembled battery 10 can also be charged. For example, when the high-power assembled battery 10 is excessively discharged, the charger 36 can be connected to a positive electrode terminal and a negative electrode terminal of the high-power assembled battery 10 to charge the high-power assembled battery 10. Switching can be made by using a switch or the like between the electric power supply from the charger 36 to the high-capacity assembled battery 20 and the electric power supply from the charger 36 to the high-power assembled battery 10.

The vehicle according to the present embodiment can be run by using only the output from the high-power assembled battery 10 and the output from the high-capacity assembled battery 20. This running mode is referred to as an EV (Electric Vehicle) mode. For example, the vehicle can be run by discharging the high-capacity assembled battery 20 from near 100% to near 0% SOC (State of Charge). After the SOC of the high-capacity assembled battery 20 reaches near 0%, an external power source can be used to charge the high-capacity assembled battery 20.

When a driver presses an accelerator pedal to increase the output required of the vehicle in the EV running mode, not only the output from the high-capacity assembled battery 20 but also the output from the high-power assembled battery 10 can be used to run the vehicle. The combinational use of the high-capacity assembled battery 20 and the high-power assembled battery 10 can ensure the battery output in accordance with the pressing of the accelerator pedal to improve the drivability.

After the SOC of the high-capacity assembled battery 20 reaches near 0%, the high-power assembled battery 10 and the engine 34 can be used in combination to run the vehicle. This running mode is referred to as an HV (Hybrid Vehicle) running mode. In the HV running mode, the charge and discharge of the high-power assembled battery 10 can be controlled such that the SOC of the high-power assembled battery 10 is changed on the basis of a predefined reference SOC, for example.

Specifically, when the SOC of the high-power assembled battery 10 is higher than the reference SOC, the high-power assembled battery 10 can be discharged to bring the SOC of the high-power assembled battery 10 closer to the reference SOC. Alternatively, when the SOC of the high-power assembled battery 10 is lower than the reference SOC, the high-power assembled battery 10 can be charged to bring the SOC of the high-power assembled battery 10 closer to the reference SOC. In the HV running mode, not only the high-power assembled battery 10 but also the high-capacity assembled battery 20 can be used. Specifically, the capacity of the high-capacity assembled battery 20 is reserved, and the high-capacity assembled battery 20 can be discharged in the HV running mode. In addition, the regenerative power may be stored in the high-capacity assembled battery 20.

As described above, the high-capacity assembled battery 20 can be used mainly in the EV running mode, and the high-power assembled battery 10 can be used mainly in the HV running mode. The main use of the high-capacity assembled battery 20 in the EV running mode means the following two cases.

Firstly, it means that the frequency of use of the high-capacity assembled battery 20 is higher than that of the high-power assembled battery 10 in the EV running mode. Secondly, when the high-capacity assembled battery 20 and the high-power assembled battery 10 are used in combination in the EV running mode, the main use of the high-capacity assembled battery 20 means that the proportion of the electric power output therefrom in the total electric power used in running of the vehicle is higher than the proportion of the electric power output from the high power assembled battery 10. The total electric power refers to an electric power used in a predetermined running time or a running distance, rather than a momentary electric power.

Figure 2:
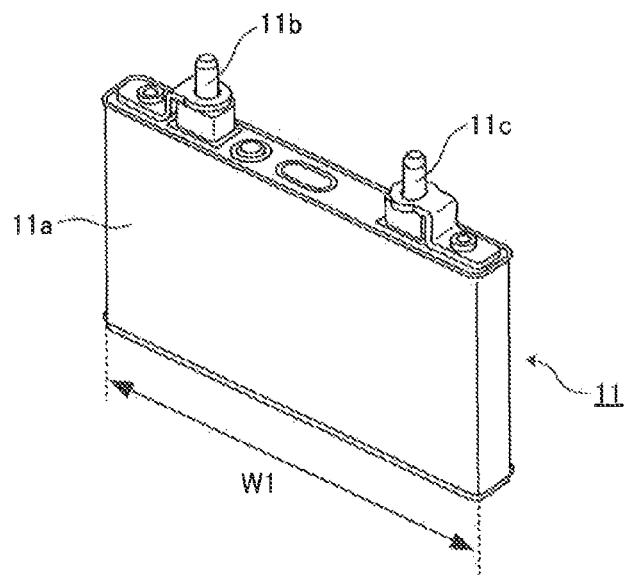
FIG. 2 is an external view of a cell used in a high-power assembled battery.

As shown in FIG. 1, the high-power assembled battery 10 has a plurality of cells 11 connected in series. A secondary battery such as a nickel metal hydride battery or a lithium-ion battery can be used as the cell 11. The number of the cells 11 constituting the high-power assembled battery 10 can be set as appropriate by taking account of the output required of the high-power assembled battery 10 and the like. As shown in FIG. 2, the cell 11 is a so-called square-type cell. The square-type cell refers to a cell having an outer shape conformed to a rectangle.

In FIG. 2, the cell 11 has a battery case 11a conformed to a rectangle. The battery case 11a accommodates a power-generating element performing charge and discharge. The power-generating element has a positive electrode component, a negative electrode component, and a separator placed between the positive electrode element and the negative electrode element. The separator contains an electrolytic solution. The positive electrode component has a collector plate and a positive electrode active material layer formed on a surface of the collector plate. The negative electrode component has a collector plate and a negative electrode active material layer formed on a surface of the collector plate.

A positive electrode terminal 11b and a negative electrode terminal 11c are placed on an upper face of the battery case 11a. The positive electrode terminal 11b is connected electrically to the positive electrode component of the power-generating element, and the negative electrode terminal 11c is connected electrically to the negative electrode component of the power-generating element.

Figure 3:
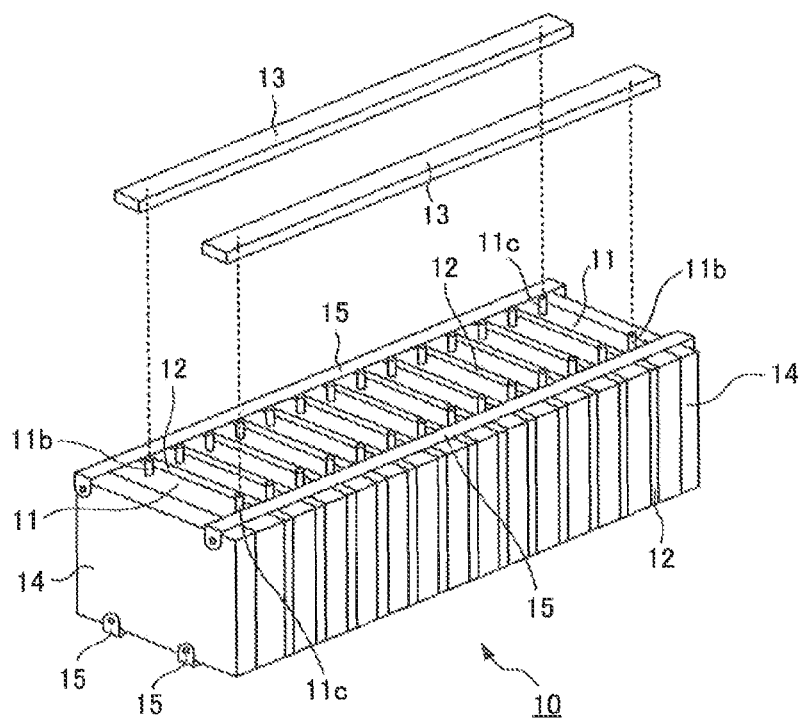
FIG. 3 is an external view of the high-power assembled battery.

As shown in FIG. 3, the high-power assembled battery 10 has the plurality of cells 11 placed side by side in one direction. A partitioning plate 12 is placed between adjacent two of the cells 11. The partitioning plate 12 can be made of an insulating material such as resin to ensure the insulating state between the two cells 11.

The use of the partitioning plate 12 can provide space on an outer face of the cell 11. Specifically, the partitioning plate 12 can have a protruding portion which protrudes toward the cell 11, and the end of the protruding portion can be brought into contact with the cell 11 to provide the space between the partitioning plate 12 and the cell 11. In this space, air used for adjusting the temperature of the cell 11 can be moved.

When the cell 11 generates heat due to charge and discharge or the like, air for cooling can be introduced into the space provided between the partitioning plate 12 and the cell 11. The air for cooling can exchange heat with the cell 11 to suppress a rise in temperature of the cell 11. Alternatively, when the cell 11 is excessively cooled, air for heating can be introduced into the space provided between the partitioning plate 12 and the cell 11. The air for heating can exchange heat with the cell 11 to suppress a drop in temperature of the cell 11.

The plurality of cells 11 are connected electrically in series through two bus bar modules 13. The bus bar module 13 has a plurality of bus bars and a holder for holding the plurality of bus bars. The bus bar is made of a conductive material and is connected to the positive electrode terminal 11$b$ of one of two adjacent cells 11 and the negative electrode terminal 11$c$ of the other cell 11. The holder is formed of an insulating material such as resin.

A pair of end plates is placed at both ends of the high-power assembled battery 10 in the direction in which the plurality of cells 11 are arranged. Restraint bands 15 extending in the direction of the arrangement of the plurality of cells 11 are connected to the pair of end plates 14. This can apply a restraint force to the plurality of cells 11. The restraint force refers to a force with which each of the cells 11 is held tightly in the direction of the arrangement of the plurality of cells 11. The restraint force applied to the cells 11 can suppress expansion of the cell 11 or the like.

In the present embodiment, two restraint bands 15 are placed on an upper face of the high-power assembled battery 10 and two restraint bands 15 are placed on a lower face of the high-power assembled battery 10. The number of the restraint bands 15 can be set as appropriate. It is only required that the use of the restraint bands 15 and the end plates 14 can apply the restraint force to the cells 11. Alternatively, the restraint force may not be applied to the cells 11, and the end plates 14 and the restraint bands 15 may be omitted.

While the plurality of cells 11 are arranged in one direction in the present embodiment, the present invention is not limited thereto. For example, a plurality of cells may be used to constitute a single battery module, and a plurality of such battery modules may be arranged in one direction.

As shown in FIG. 1, the high-capacity assembled battery 20 has a plurality of battery blocks 21 connected in series. Each of the battery blocks 21 has a plurality of cells 22 connected in parallel. The number of the battery blocks 21 and the number of the cells 22 included in each of the battery blocks 21 can be set as appropriate in view of the output required of the high-capacity assembled battery 20, the capacity thereof or the like. While the plurality of cells 22 are connected in parallel in the battery block 21 of the present embodiment, the present invention is not limited thereto. Specifically, a plurality of battery modules each including a plurality of cells 22 connected in series may be provided and connected in parallel to constitute the battery block 21.

Figure 4:
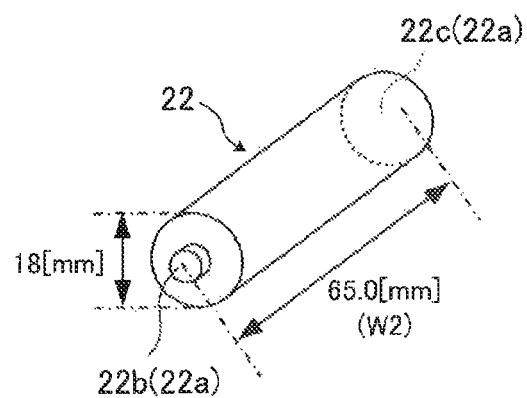
FIG. 4 is an external view of a cell used in a high-capacity assembled battery.

A secondary battery such as a nickel metal hydride battery or a lithium ion battery can be used as the cell 22. As shown in FIG. 4, the cell 22 is a so-called cylinder-type cell. The cylinder-type cell refers to a cell having an outer shape conformed to a cylinder.

As shown in FIG. 4, the cylinder-type cell 22 has a cylinder-type battery case 22$a$. The battery case 22$a$ accommodates a power-generating element. The power-generating element in the cell 22 has constituent members similar to the constituent members of the power-generating element in the cell 11.

A positive electrode terminal 22$b$ and a negative electrode terminal 22$c$ are provided at both ends of the cell 22 in a longitudinal direction. The positive electrode terminal 22$b$ and the negative electrode terminal 22$c$ form the battery case 22$a$. The positive electrode terminal 22$b$ is connected electrically to a positive electrode component of the power-generating element, and the negative electrode terminal 22$c$ is connected electrically to a negative electrode component of the power-generating element. The cell 22 of the present embodiment is a battery called 18650 type having a diameter of 18 mm and a length of 65.0 mm. The cell 22 may be a cell having dimensions different from those of the 18650 type.

The size of the square-type cell 11 is larger than the size of the cylinder-type cell 22. The size of each of the cells 11 and 22 refers to the size of the portion thereof having the largest dimension. Specifically, in the configuration of the cell 11 shown in FIG. 2, a length W1 can be regarded as the size of the cell 11. In the configuration of the cell 22 shown in FIG. 4, a length W2 can be regarded as the size of the cell 22. The length W1 is larger than the length W2.

Figure 5:
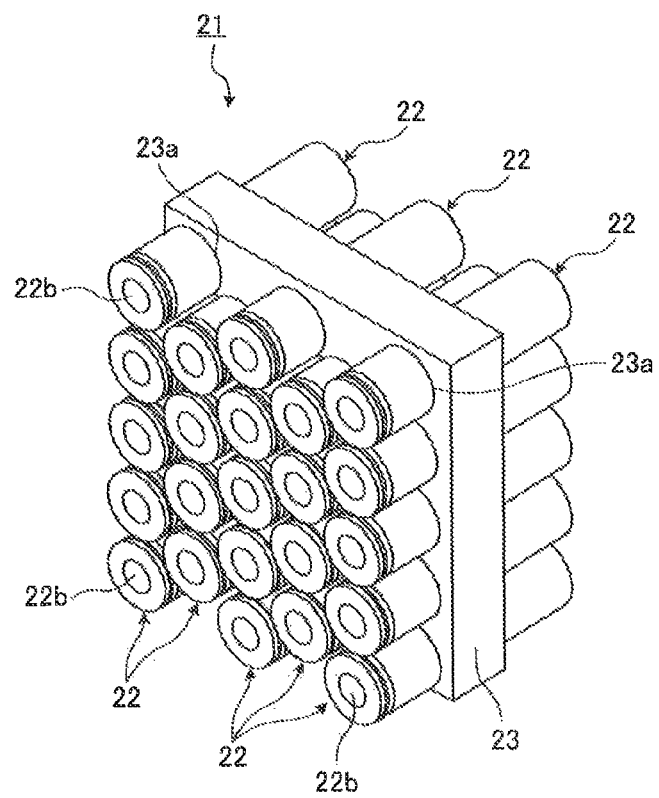
FIG. 5 is an external view of a battery block used in the high-capacity assembled battery.

As shown in FIG. 5, the battery block 21 has the plurality of cells 22 and a holder 23 which holds the plurality of cells 22. The plurality of battery blocks 21 are arranged in order to constitute the high-capacity assembled battery 20. The plurality of battery blocks 21 are connected in series through an electrical cable or the like. The high-capacity assembled battery 20 is used to ensure the running distance in the EV running mode, and the many cells 22 are used. Thus, the size of the high-capacity assembled battery 20 tends to be larger than the size of the high-power assembled battery 10.

The holder 23 has through holes 23$a$ into which each of the cells 22 is inserted. The number of the through holes 23$a$ provided is equal to the number of the cells 22. The cell 22 extends in a direction orthogonal to the plane on which the holder 23 is placed. The plurality of cells 22 are arranged in order within the plane on which the holder 23 is placed. The plurality of cells 22 are placed such that the positive electrode terminals 22$b$ (or the negative electrode terminals 22$c$) are located on the same side of the holder 23. The plurality of positive electrode terminals 22$b$ are connected to a single bus bar, and the plurality of negative electrode terminals 22$c$ are connected to a single bus bar. This electrically connects the plurality of cells 22 in parallel.

While the single holder 23 is used in the battery block 21 of the present embodiment, a plurality of holders 23 may be used. For example, one of the holders 23 can be used to hold the cells 22 on the side of the positive electrode terminals 22$b$, and the other holder 23 can be used to hold the cells 22 on the side of the negative electrode terminals 22$c$.

Next, description is made of the characteristics of the cell 11 used in the high-power assembled battery 10 and the characteristics of the cell 22 used in the high-capacity assembled battery 20. Table 1 shows the comparison between the characteristics of the cells 11 and 22. In Table 1, "high" and "low" represent the relative levels when the two cells 11 and 22 are compared. Specifically, "high" represents a higher level than that of the compared cell, and "low" represents a lower level than that of the compared cell.

TABLE 1

|  | cell 11 (high-power type) | cell 22 (high-capacity type) |
|---|---|---|
| output density | high | low |
| power capacity density | low | high |
| dependence of input/output on temperature | low | high |
| dependence of battery life on temperature | low | high |

The cell 11 has an output density higher than that of the cell 22. The output density of each of the cells 11 and 22 can be represented as an electric power per unit mass of the cell (in W/kg) or an electric power per unit volume of the cell (in W/L). When the cells 11 and 22 have equal masses or volumes, the output (W) of the cell 11 is higher than the output (W) of the cell 22.

The output density in the electrode component (positive electrode component or negative electrode component) of each of the cells 11 and 22 can be represented as a current value per unit area of the electrode component (in $mA/cm^2$). The output density of the electrode component of the cell 11 is higher than that of the cell 22. When the electrode components have equal areas, the value of a current capable of passing through the electrode component of the cell 11 is higher than the value of a current capable of passing through the electrode component of the cell 22.

The cell 22 has an electric power capacity density higher than that of the cell 11. The electric power capacity density of each of the cells 11 and 22 can be represented as a capacity per unit mass of the cell (in Wh/kg) or a capacity per unit volume of the cell (in Wh/L). When the cells 11 and 22 have equal masses or volumes, the electric power capacity (Wh) of the cell 22 is higher than the electric power capacity (Wh) of the cell 11.

The capacity density in the electrode component of each of the cells 11 and 22 can be represented as a capacity per unit mass of the electrode component (in mAh/g) or a capacity per unit volume of the electrode component (in mAh/cc), for example. The capacity density of the electrode component of the cell 22 is higher than that of the cell 11. When the electrode components have equal masses or volumes, the capacity of the electrode component of the cell 22 is higher than the capacity of the electrode component of the cell 11.

Figure 6:
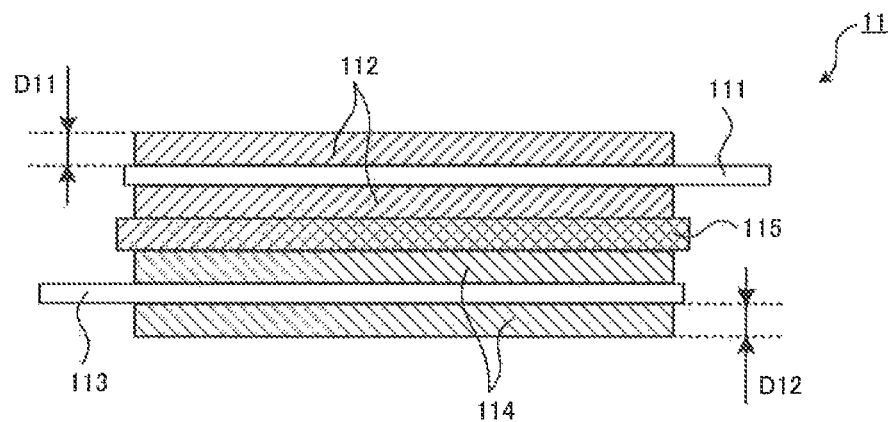
FIG. 6 is a diagram showing the configuration of a power-generating element used in the cell of the high-power assembled battery.
Figure 7:
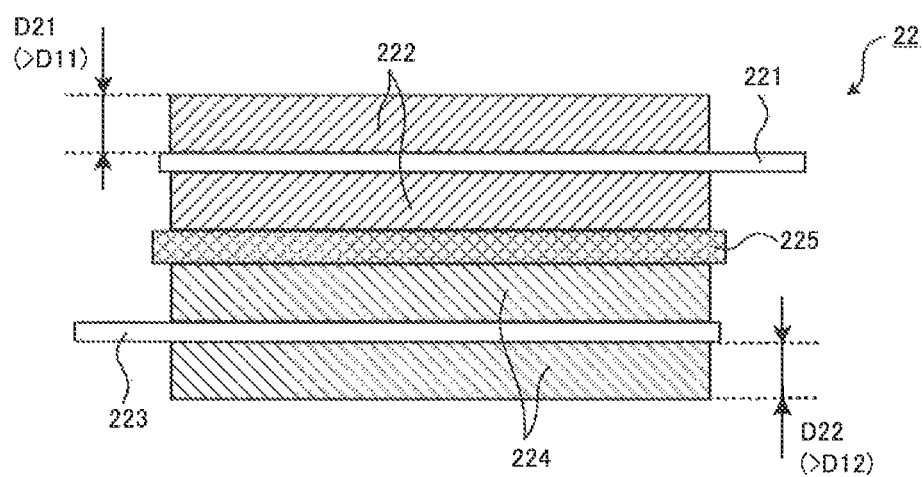
FIG. 7 is a diagram showing the configuration of a power-generating element used in a cell of the high-capacity assembled battery.

FIG. 6 is a schematic diagram showing the configuration of the power-generating element in the cell 11. FIG. 7 is a schematic diagram showing the configuration of the power-generating element in the cell 22.

In FIG. 6, the positive electrode component forming part of the power generating element of the cell 11 has a collector plate 111 and an active material layer 112 formed on each face of the collector plate 111. When the cell 11 is a lithium-ion secondary battery, aluminum can be used as the material of the collector plate 111, for example. The active material layer 112 includes a positive electrode active material, a conductive material, a binder and the like.

The negative electrode component forming part of the power-generating element of the cell 11 has a collector plate 113 and an active material layer 114 formed on each face of the collector plate 113. When the cell 11 is a lithium-ion secondary battery, copper can be used as the material of the collector plate 113, for example. The active material layer 114 includes a negative electrode active material, a conductive material, a binder and the like.

A separator 115 is placed between the positive electrode component and the negative electrode component. The separator 115 is in contact with the active material layer 112 of the positive electrode component and the active material layer 114 of the negative electrode component. The positive electrode component, the separator 115, and the negative electrode component are layered in this order to constitute a laminate, and the laminate is wound, thereby making it possible to form the power-generating element.

While the active material layer 112 is formed on each face of the collector plate 111 and the active material layer 114 is formed on each face of the collector plate 113 in the present embodiment, the present invention is not limited thereto. Specifically, a so-called bipolar electrode can be used. The bipolar electrode has a positive electrode active material layer 112 formed on one face of a collector plate and a negative electrode active material layer 114 formed on the other face of the collector plate. A plurality of such bipolar electrodes are layered with separators interposed, so that the power-generating element can be formed.

In FIG. 7, the positive electrode component forming part of the power-generating element of the cell 22 has a collector plate 221 and an active material layer 222 formed on each face of the collector plate 221. When the cell 22 is a lithium-ion secondary battery, aluminum can be used as the material of the collector plate 221, for example. The active material layer 222 includes a positive electrode active material, a conductive material, a binder and the like.

The negative electrode component forming part of the power-generating element of the cell 22 has a collector plate 223 and an active material layer 224 formed on each face of the collector plate 223. When the cell 22 is a lithium-ion secondary battery, copper can be used as the material of the collector plate 223, for example. The active material layer 224 includes a negative electrode active material, a conductive material, a binder and the like. A separator 225 is placed between the positive electrode component and the negative electrode component. The separator 225 is in contact with the active material layer 222 of the positive electrode component and the active material layer 224 of the negative electrode component.

As shown in FIG. 6 and FIG. 7, a thickness D11 of the active material layer 112 is smaller than a thickness D21 of the active material layer 222 when the positive electrode components of the cell 11 and the cell 22 are compared. When the negative electrode components of the cell 11 and the cell 22 are compared, a thickness D12 of the active material layer 114 is smaller than a thickness D22 of the active material layer 224. The thicknesses D11 and D12 of the active material layers 112 and 114 smaller than the thicknesses D21 and D22 of the active material layers 222 and 224 can easily pass a current between the positive electrode component and the negative electrode component in the cell 11. Thus, the output density of the cell 11 is higher than the output density of the cell 22.

The volume per unit capacity (in cc/mAh) of the active material layer 112 is larger than that of the active material layer 222, and the volume per unit capacity of the active material layer 114 is larger than that of the active material layer 224. Since the thicknesses D21 and D22 of the active material layers 222 and 224 are larger than the thicknesses D11 and D12 of the active material layers 112 and 114, the capacity density of the cell 22 is higher than the capacity density of the cell 11.

Figure 8:
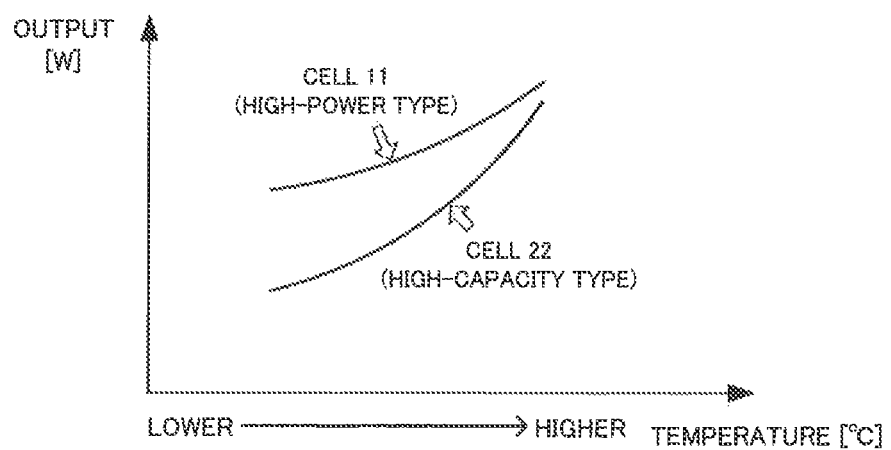
FIG. 8 is a graph showing the relationship between the output of the cell and temperature.

Next, description is made of the dependence of the battery on temperature. As shown in Table 1, the cell 22 has a higher dependence of input and output on temperature than that of the cell 11. Specifically, the input and output of the cell 22 are changed more easily than the input and output of the cell 11 in response to a temperature change. FIG. 8 shows the output characteristics of the cells 11 and 22 with respect to temperature. In FIG. 8, the horizontal axis represents the temperature and the vertical axis represents the output. While FIG. 8 shows the output characteristics of the cells 11 and 22, the input characteristics of the cells 11 and 22 have relationships similar to those shown in FIG. 8.

As shown in FIG. 8, the output performance of each of the cell (high-power type) 11 and the cell (high-capacity type) 22 is reduced as the temperature drops. The reduction rate of the output performance in the cell 11 is lower than the reduction rate of the output performance in the cell 22. In other words, the output performance of the cell 22 is more susceptible to the temperature than the output performance of the cell 11 and has a higher dependence on the temperature than the cell 11.

Figure 9:
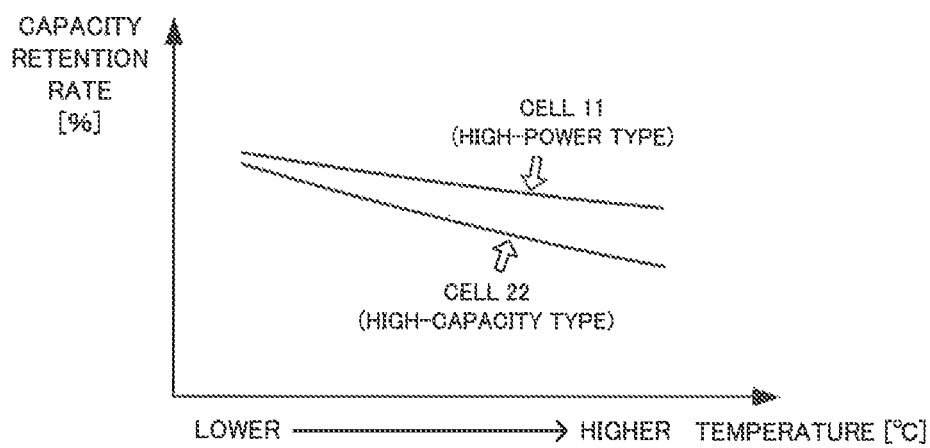
FIG. 9 is a graph showing the relationship between the capacity retention rate of the cell and temperature.

FIG. 9 is a graph showing the relationship between the capacity retention rate of each of the cells 11 and 22 and temperature. In FIG. 9, the horizontal axis represents the temperature and the vertical axis represents the capacity retention rate. The capacity retention rate is represented by the ratio between the capacity of each of the cells 11 and 22 in an initial state and the capacity of each of the cells 11 and 22 in a used state (deteriorated state) (deteriorated capacity/initial capacity). The initial state refers to the state immediately after each of the cells 11 and 22 is manufactured and before each of the cells 11 and 22 is used. The graph shown in FIG. 9 shows the capacity retention rates of the cells 11 and 22 after the cells are repeatedly charged and discharged at each temperature.

As shown in FIG. 9, the capacity retention rates of the cells 11 and 22 tend to be reduced as the temperature rises. The reductions in the capacity retention rate represent the deterioration of the cells 11 and 22. The reduction rate of the capacity retention rate of the cell 22 with respect to the temperature rise is higher than that of the cell 11. In other words, the cell 22 is deteriorated more readily than the cell 11 in response to the temperature rise (temperature change). In this manner, the high-capacity assembled battery 20 has a higher dependence on temperature than that of the high-power assembled battery 10.

Figure 10:
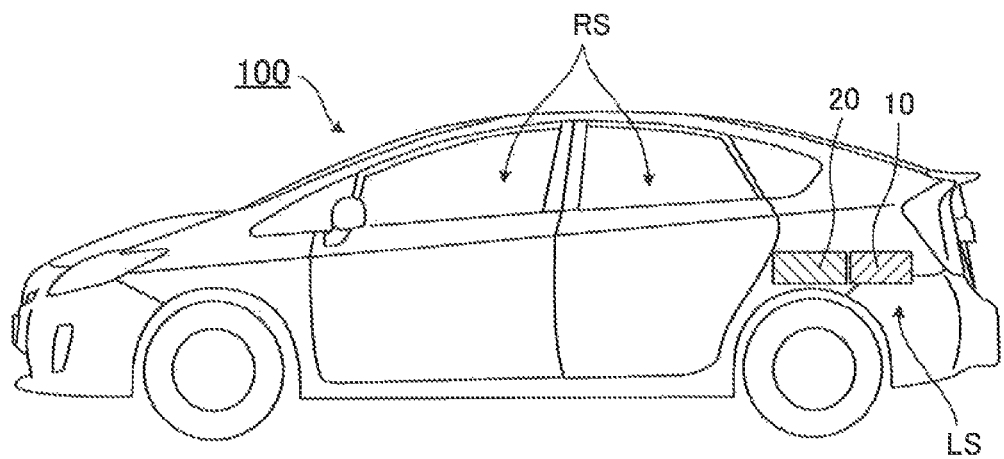
FIG. 10 is a schematic diagram of a vehicle on which the high-power assembled battery and the high-capacity assembled battery are mounted.

Next, description is made of the placement of the high-power assembled battery 10 and the high-capacity assembled battery 20 on the vehicle with reference to FIG. 10.

The high-power assembled battery 10 and the high-capacity assembled battery 20 are mounted in a luggage space LS of the vehicle 100. Specifically, the high-power assembled battery 20 and the high-capacity assembled battery 20 are placed around the space where luggage is put. The luggage space LS is located in back of a space RS where passengers ride (the interior of the vehicle) in the vehicle 100. The riding space RS for the passenger is defined by the placement of seats. The vehicle 100 may be a vehicle in which the riding space RS is separated from the luggage space LS by a partitioning member or a vehicle in which the riding space RS communicates with the luggage space LS.

While the assembled batteries 10 and 20 are placed in the luggage space LS in the present embodiment, the present invention is not limited thereto. It is only required that the assembled batteries 10 and 20 should be mounted on the vehicle 100, and the position to place the assembled batteries 10 and 20 can be set as appropriate. For example, the assembled batteries 10 and 20 can be placed in the riding space RS. Specifically, the assembled batteries 10 and 20 can be placed in the space formed between a driver's seat and a passenger's seat or the space formed below a seat cushion. Alternatively, the assembled batteries 10 and 20 can be placed along the outer face of a vehicle body. For example, the assembled batteries 10 and 20 can be attached to the surface of a floor panel toward the outside of the vehicle.

Figure 11:
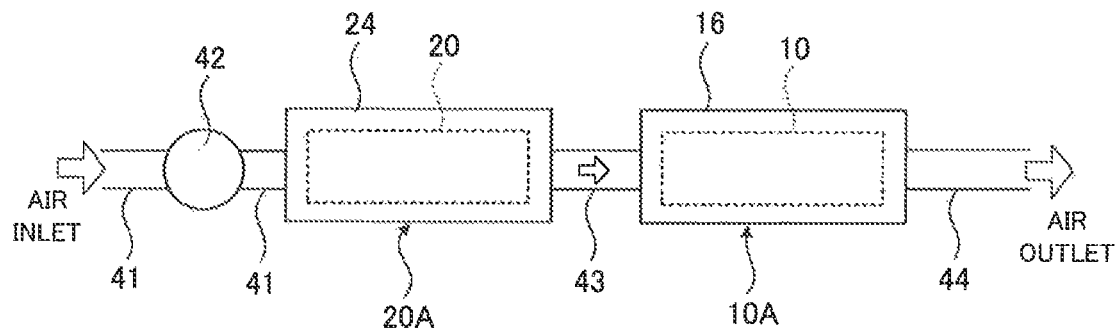
FIG. 11 is a schematic diagram showing a structure for adjusting the temperatures of the high-power assembled battery and the high-capacity assembled battery.

Air in the riding space RS is supplied to the high-power assembled battery 10 and the high-capacity assembled battery 20 to adjust the temperatures of the assembled batteries 10 and 20. FIG. 11 is a schematic diagram showing a structure for adjusting the temperatures of the assembled batteries 10 and 20. The temperature of the riding space RS is often adjusted to a temperature suitable for the temperature adjustment of the assembled batteries 10 and 20 through the use of an air conditioner or the like installed on the vehicle 100. Although the use of the air conditioner easily adjusts the temperature of the riding space RS, the adjustment of the temperature of the riding space RS can be performed, for example by opening a window for ventilation, without using the air conditioner. The supply of the air in the riding space RS to the assembled batteries 10 and 20 can facilitate the temperature adjustment of the assembled batteries 10 and 20.

While the air in the riding space RS is supplied to the assembled batteries 10 and 20 in the present embodiment, the present invention is not limited thereto. For example, air present outside the vehicle 100 may be supplied to the assembled batteries 10 and 20. When the assembled batteries 10 and 20 are placed along the outer face of the vehicle body, the air present outside the vehicle 100 can be supplied to the assembled batteries 10 and 20. While the air is supplied to the assembled batteries 10 and 20 in the present embodiment, a gas containing a component different from the air may be supplied to the assembled batteries 10 and 20.

A battery pack 20A has the high-capacity assembled battery 20 and a pack case 24 for accommodating the high-capacity assembled battery 20. An air inlet duct 41 is connected to the pack case 24, and an air inlet port provided at the end of the air inlet duct 41 faces the riding space RS. A blower 42 is attached to the air inlet duct 41 and is driven to take the air in the riding space RS into the air inlet duct 41 through the air inlet port. The driving of the blower 42 can be controlled by the controller 35 (see FIG. 1). The controller 35 may be divided into a plurality of controllers associated with the items to be controlled thereby. The air taken into the air inlet duct 41 enters into the pack case 24 and is used for the temperature adjustment of the high-capacity assembled battery 20.

The air entering into the pack case 24 exchanges heat with the cell 22 of the high-capacity assembled battery 20 to adjust the temperature of the cell 22. For example, when the cell 22 generates heat due to charge and discharge or the like, air for cooling can be brought into contact with the cell 22 to suppress a rise in temperature of the cell 22. When the cell 22 is excessively cooled, air for heating can be brought into contact with the cell 22 to suppress a drop in temperature of the cell 22.

The battery pack 20A is connected to a battery pack 10A through a connecting duct 43. Specifically, one end of the connecting duct 43 is connected to the pack case 24, and the other end of the connecting duct 43 is connected to a pack case 16. The pack case 16 accommodates the high-power assembled battery 10, and the pack case 16 and the high-power assembled battery 10 constitute the battery pack 10A.

After the passage through the pack case 24, the air passes through the connecting duct 43 toward the pack case 16. The air entering into the pack case 16 exchanges heat with the cell 11 of the high-power assembled battery 10 to adjust the temperature of the cell 11. An air outlet duct 44 is connected to the pack case 16. The air used in the temperature adjustment of the high-power assembled battery 10 is directed to the air outlet duct 44 and then discharged to the outside of the battery pack 10A. In the structure shown in FIG. 11, the air inlet duct 41, the blower 42, the connecting duct 43, and the air outlet duct 44 correspond to a temperature adjusting mechanism in the present invention.

While the battery pack 20A (pack case 24) is connected to the battery pack 10A (pack case 16) through the connecting duct 43 in the present embodiment, the present invention is not limited thereto. A structure shown in FIG. 12 can be used as the structure for adjusting the temperature of the assembled batteries 10 and 20, for example.

Figure 12:
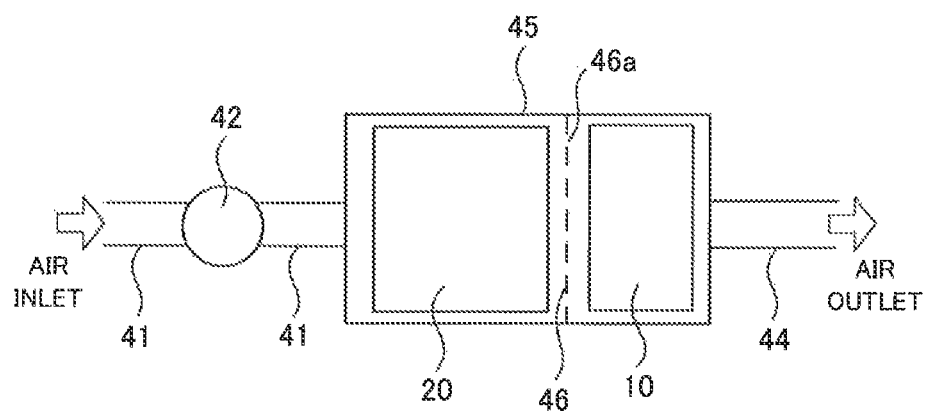
FIG. 12 is a schematic diagram showing a structure for adjusting the temperatures of the high-power assembled battery and the high-capacity assembled battery.

In FIG. 12, the high-capacity assembled battery 20 and the high-power assembled battery 10 are housed in a single pack case 45. A partitioning plate 46 is placed within the pack case 45. The partitioning plate 46 divides the internal space of the pack case 45 into a space for accommodating the high-capacity assembled battery 20 and a space for accommodating the high-power assembled battery 10. The partitioning plate 46 has a plurality of through holes 46a.

In the configuration shown in FIG. 12, driving of the blower 42 causes the air in the riding space RS to be taken into the air inlet duct 41. The air inlet duct 41 is connected to the pack case 45, and the air passing through the air inlet duct 41 enters into the pack case 45 (in other words, the space accommodating the high-capacity assembled battery 20). The air entering into the pack case 45 first comes into contact with the high-capacity assembled battery 20 to adjust the temperature of the high-capacity assembled battery 20.

After heat exchange with the high-capacity assembled battery 20, the air passes through the through holes 46a in the partitioning plate 46 to move to the space accommodating the high-power assembled battery 10. The air passing through the through holes 46a comes into contact with the high-power assembled battery 10 to adjust the temperature of the high-power assembled battery 10. After heat exchange with the high-power assembled battery 10, the air is directed to the air outlet duct 44. The air outlet duct 44 is connected to the pack case 45 (the space accommodating the high-power assembled battery 10) to discharge the air present within the pack case 45 to the outside of the pack case 45. In the structure shown in FIG. 12, the air inlet duct 41, the blower 42, the partitioning plate 46, and the air outlet duct 44 correspond to the temperature adjusting mechanism in the present invention.

While the blower 42 is placed on the air inlet duct 41 in the configurations shown in FIG. 11 and FIG. 12, the present invention is not limited thereto. It is only required that the driving of the blower 42 should take the air in the riding space RS into the air inlet duct 41. For example, in the configuration shown in FIG. 11, the blower 42 may be placed on the connecting duct 43 or the air outlet duct 44. In the configuration shown in FIG. 12, the blower 42 may be placed on the air outlet duct 44.

During the charge of the high-capacity assembled battery 20 with the electric power supplied from the external power source (charger 36), the high-capacity assembled battery 20 generates more heat than the high-power assembled battery 10. Since the electric power from the external power source is supplied only to the high-capacity assembled battery 20, the high-capacity assembled battery 20 generates more heat than the high-power assembled battery 10. Even when the electric power is supplied from the external power source to both the high-capacity assembled battery 20 and the high-power assembled battery 10, the high-capacity assembled battery 20 generates more heat than the high-power assembled battery 10. Since the high-capacity assembled battery 20 has an energy capacity relatively larger than that of the high-power assembled battery 10 and can store a more electric energy in the charge, the high-capacity assembled battery 20 generates more heat than the high-power assembled battery 10 upon reception of the electric power from the external power source.

When the blower 42 is driven during the charge of the high-capacity assembled battery 20, the air in the riding space RS can be supplied to the high-capacity assembled battery 20 to suppress a rise in temperature of the high-capacity assembled battery 20. Since the high-capacity assembled battery 20 is placed on the air flow path upstream of the high-power assembled battery 10, the air in the riding space RS comes into contact with the high-capacity assembled battery 20 earlier than with the high-power assembled battery 10. This can easily adjust the temperature of the high-capacity assembled battery 20.

When the EV running mode has a higher priority than the HV running mode in running of the vehicle 100, the frequency of use of the high-capacity assembled battery 20 is higher than that of the high-power assembled battery 10. In the case of the EV running mode having a higher priority than the HV running mode, the vehicle 100 is run in the EV running mode immediately after the starting, and when the running in the EV running mode can no longer be performed, the EV running mode can be switched to the HV running mode, for example.

When the frequency of use of the high-capacity assembled battery 20 is higher than that of the high-power assembled battery 10, the high-capacity assembled battery 20 continues to be used for a longer time than the high-power assembled battery 10 and thus produces more heat than the high-power assembled battery 10. According to the present embodiment, the air in the riding space RS is first supplied to the high-capacity assembled battery 20, so that the temperature adjustment of the high-capacity assembled battery 20 can be performed with a higher priority than the temperature adjustment of the high-power assembled battery 10. The high-capacity assembled battery 20, which produces more heat than the high-power assembled battery 10, can be cooled efficiently.

As described with reference to FIG. 9, the high-capacity assembled battery 20 has the higher dependence on temperature than the high-power assembled battery 10, so that the high-capacity assembled battery 20 may be deteriorated more easily than the high-power assembled battery 10 in response to a temperature change. Thus, the higher priority given to the temperature adjustment of the high-capacity assembled battery 20 than the high-power assembled battery 10 can suppress the proceeding of the deterioration of the high-capacity assembled battery 20.

Since the high-capacity assembled battery 20 has the higher dependence on temperature than the high-power assembled battery 10 as described with reference to FIG. 8, the input/output of the high-capacity assembled battery 20 may be reduced at each temperature more easily than the input/output of the high-power assembled battery 10. Thus, the higher priority given to the temperature adjustment of the high-capacity assembled battery 20 than the high-power assembled battery 10 can suppress the reduction in the input/output of the high-capacity assembled battery 20. For example, in heating the assembled batteries 10 and 20, the air for heating can be brought into contact with the high-capacity assembled battery 20 earlier than the high-power assembled battery 10 to heat the high-capacity assembled battery 20 efficiently, thereby ensuring the input/output of the high-capacity assembled battery 20.

Figure 13:
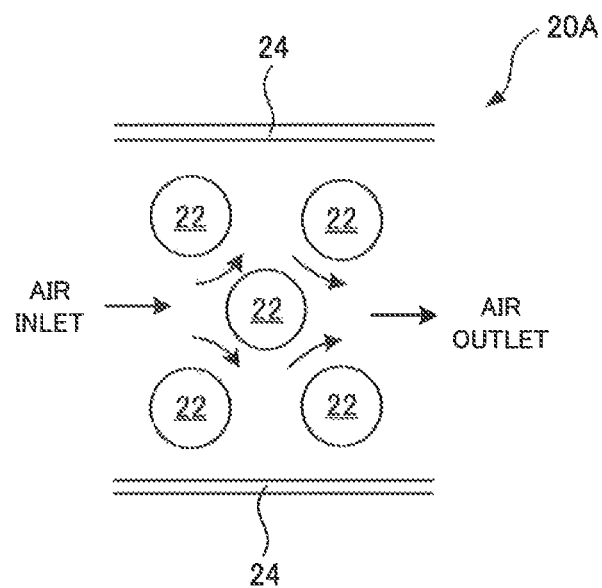
FIG. 13 is a diagram for explaining the flow of air used in temperature adjustment of the high-capacity assembled battery.
Figure 14:
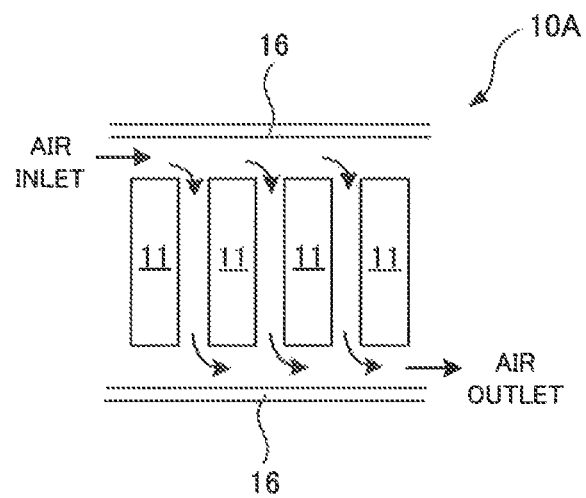
FIG. 14 is a diagram for explaining the flow of air used in temperature adjustment of the high-power assembled battery.

In adjusting the temperature of the high-capacity assembled battery 20, the air for temperature adjustment can be moved along the outer peripheries of the cylinder-type cells 22 as shown in FIG. 13. FIG. 13 is a schematic diagram of the battery pack 20A when viewed from the longitudinal direction of the cell 22. The air for temperature adjustment can be moved along a plane orthogonal to the longitudinal direction of the cell 22. In adjusting the temperature of the high-power assembled battery 10, the air for temperature adjustment passes between adjacent two of the cells 11 as shown in FIG. 14. Specifically, the air for temperature adjustment moves in the direction of the arrangement of the plurality of cells 11 and then enters between the adjacent two of the cells 11.

The air used for temperature adjustment of the high-capacity assembled battery 20 moves more smoothly than the air used for temperature adjustment of the high-power assembled battery 10. Specifically, since the outer face of the cylinder-type cell 22 is formed of a curved face as shown in FIG. 4, the air moves smoothly along the outer peripheral face of the cell 22. On the other hand, in adjusting the temperature of the high-power assembled battery 10, the air should move in the direction of the arrangement of the plurality of cells 11 and then enter between the adjacent two of the cells 11. In other words, the movement direction of the air for temperature adjustment of the cells 11 should be changed abruptly.

The flow path shown in FIG. 14 has a pressure loss which tends to be higher than that of the flow path shown in FIG. 13. Since the air can move smoothly along the outer peripheral face of the cell 22 in the flow path shown in FIG. 13, the pressure loss tends to be low. On the other hand, the air should enter between the adjacent two of the cells 11 in the flow path shown in FIG. 14, so that the pressure loss tends to be higher at the point where the air enters between the two cells 11. As the pressure loss is increased, noise is produced more easily.

Since the high-capacity assembled battery 20 is placed on the air flow path upstream of the high-power assembled battery 10, the high-capacity assembled battery 20 can prevent the noise produced in the high-power assembled battery 10 from traveling to the air inlet duct 41. This can prevent any noise from passing through the air inlet duct 41 and then reaching a passenger present in the riding space RS.

Since the air moves along the high-capacity assembled battery 20 more smoothly than along the high-power assembled battery 10, part of the air directed to the high-capacity assembled battery 20 does not sufficiently exchange heat with the high-capacity assembled battery 20. Since the size of the cell 22 is smaller than the size of the cell 11, the amount of the heat exchanged between the cell 22 and the air is smaller than the amount of the heat exchanged between the cell 11 and the air. Thus, the air for temperature adjustment can also be directed to the high-power assembled battery 10 placed downstream of the high-capacity assembled battery 20 to achieve the temperature adjustment of the high-power assembled battery 10. The air after the cooling of the high-capacity assembled battery 20 still has the ability to cool the high-power assembled battery 10. The air after the heating of the high-capacity assembled battery 20 still has the ability to heat the high-power assembled battery 10.

The invention claimed is:

1. A vehicle comprising:
a motor serving as a driving source for running the vehicle;
a high-power assembled battery and a high-capacity assembled battery each capable of supplying an electric power to the motor, the high-power assembled battery including a plurality of secondary cells connected in series, and the high-capacity battery including a plurality of secondary cells connected in parallel; and
a temperature adjusting mechanism supplying a heat exchange medium to the high-power assembled battery and the high-capacity assembled battery, the heat exchange medium being used to adjust a temperature of each of the assembled batteries,
wherein the high-power assembled battery is capable of charge and discharge with a current relatively larger than that in the high-capacity assembled battery, and
the high-capacity assembled battery has an energy capacity relatively larger than that of the high-power assembled battery, has a higher dependence of battery characteristic on temperature than that of the high-power assembled battery, and is placed on a flow path of the heat exchange medium upstream of the high-power assembled battery.

2. The vehicle according to claim 1, further comprising an engine serving as a driving source for running the vehicle, wherein, in running of the vehicle using an output from the motor with the engine stopped, the high-capacity assembled battery supplies more electric power to the motor than that from the high-power assembled battery.

3. The vehicle according to claim 2, wherein, in the running of the vehicle using the output from the motor with the engine stopped, a frequency of use of the high-capacity assembled battery is higher than a frequency of use of the high-power assembled battery.

4. The vehicle according to claim 2, wherein, in running of the vehicle using the output from the motor with the engine stopped, a proportion of the electric power supplied from the high-capacity assembled battery to the motor in the electric power supplied to the motor is higher than a proportion of the electric power supplied from the high-power assembled battery to the motor.

5. The vehicle according to claim 1, wherein the high-capacity assembled battery is charged with an electric power supplied from an external power source.

6. The vehicle according to claim 1, wherein the high-power assembled battery and the high-capacity assembled battery are placed in a luggage space.

7. The vehicle according to claim 1, wherein the secondary cell of the high-capacity assembled battery has a size smaller than that of the secondary cell of the high-power assembled battery.

8. The vehicle according to claim 7, wherein the high-power assembled battery has a plurality of square-type secondary cells placed side by side in a predetermined direction, the high-capacity assembled battery has a plurality of cylinder-type secondary cells extending in a direction orthogonal to a predetermined plane and placed in order within the predetermined plane, and
the heat exchange medium enters into space formed between two of the square-type secondary cells adjacent in the predetermined direction to exchange heat with the high-power assembled battery, and moves along the predetermined plane to exchange heat with the high-capacity assembled battery.

9. The vehicle according to claim 1, wherein the high-power assembled battery has a plurality of square-type secondary cells placed side by side in a predetermined direction, the high-capacity assembled battery has a plurality of cylinder-type secondary cells extending in a direction orthogonal to a predetermined plane and placed in order within the predetermined plane, and
the heat exchange medium enters into space formed between two of the secondary cells adjacent in the predetermined direction to exchange heat with the high-power assembled battery, and moves along the predetermined plane to exchange heat with the high-capacity assembled battery.

* * * * *